(12) United States Patent
Sagong (10) Patent No.: US 8,174,496 B2
(45) Date of Patent: May 8, 2012

(54) MOBILE COMMUNICATION TERMINAL WITH TOUCH SCREEN AND INFORMATION INPUTING METHOD USING THE SAME

(75) Inventor: Phil Sagong, Gwangmyeong-si (KR)

(73) Assignee: LG Electronics Inc., Seoul (KR)

( * ) Notice: Subject to any disclaimer, the term of this patent is extended or adjusted under 35 U.S.C. 154(b) by 1339 days.

(21) Appl. No.: 11/735,369

(22) Filed: Apr. 13, 2007

(65) Prior Publication Data

US 2008/0188267 A1    Aug. 7, 2008

(30) Foreign Application Priority Data

Feb. 7, 2007 (KR) .................. 10-2007-0012637

(51) Int. Cl.
*G09G 5/00* (2006.01)
*H04B 1/38* (2006.01)

(52) U.S. Cl. ........ 345/156; 345/168; 345/169; 345/170; 345/171; 345/172; 455/566

(58) Field of Classification Search .............. 345/1.1, 345/156, 158, 169–175; 455/566, 574, 575.1; 178/18.01; 358/400, 403; 715/702, 810, 715/700; 713/182; 235/383
See application file for complete search history.

(56) References Cited

U.S. PATENT DOCUMENTS

| | | | |
|---|---|---|---|
| 5,321,802 A * | 6/1994 | Furuya et al. ............... 358/403 |
| 5,589,855 A * | 12/1996 | Blumstein et al. ........... 345/173 |
| 5,644,628 A | 7/1997 | Schwarzer et al. |
| 5,797,089 A | 8/1998 | Nguyen |
| 5,933,783 A | 8/1999 | Kawakami et al. |
| 6,061,480 A * | 5/2000 | Kisaichi et al. ............. 382/315 |
| 6,085,171 A * | 7/2000 | Leonard ........................ 705/26 |
| 6,208,331 B1 * | 3/2001 | Singh et al. ................... 345/173 |
| 6,246,862 B1 * | 6/2001 | Grivas et al. ................. 455/566 |
| 6,488,425 B1 * | 12/2002 | Spence et al. ................ 400/714 |
| 6,643,528 B1 | 11/2003 | Shim et al. |
| 7,092,495 B2 | 8/2006 | Kraft et al. |
| 7,231,231 B2 * | 6/2007 | Kokko et al. ................. 455/566 |
| 7,246,009 B2 * | 7/2007 | Hamblen et al. ............. 701/209 |
| 7,464,860 B2 * | 12/2008 | Militello et al. ............. 235/379 |
| 7,490,761 B2 * | 2/2009 | Taylor et al. ................. 235/379 |
| 7,564,448 B2 * | 7/2009 | Yi ................................. 345/173 |
| 7,730,401 B2 * | 6/2010 | Gillespie et al. ............ 715/702 |
| 7,789,304 B2 * | 9/2010 | Cato et al. .................... 235/383 |
| 7,890,778 B2 * | 2/2011 | Jobs et al. .................... 713/300 |
| 2002/0191029 A1 * | 12/2002 | Gillespie et al. ............ 345/810 |
| 2003/0105983 A1 * | 6/2003 | Brakmo et al. .............. 713/320 |
| 2003/0202772 A1 * | 10/2003 | Dow et al. .................... 386/46 |

(Continued)

FOREIGN PATENT DOCUMENTS

EP    0 859 498 A2    8/1998

(Continued)

*Primary Examiner* — Prabodh M Dharia
(74) *Attorney, Agent, or Firm* — Birch, Stewart, Kolasch & Birch, LLP (57) ABSTRACT

A mobile terminal communication method, which includes activating a touch screen of the mobile terminal, entering into an inactive touch screen mode preventing information from being entered on the touch screen of the mobile terminal while a function is executed on the terminal, receiving an input signal through a specified key arranged on the terminal during a time when the inactive touch screen mode is entered, and entering into an active touch screen mode allowing information to be entered on the touch screen in accordance with the received input signal.

34 Claims, 12 Drawing Sheets

U.S. PATENT DOCUMENTS

| | | | |
|---|---|---|---|
| 2004/0203803 A1* | 10/2004 | Taylor | 455/445 |
| 2004/0210341 A1* | 10/2004 | Wallace et al. | 700/237 |
| 2005/0017957 A1* | 1/2005 | Yi | 345/173 |
| 2005/0024341 A1* | 2/2005 | Gillespie et al. | 345/173 |
| 2005/0079896 A1* | 4/2005 | Kokko et al. | 455/566 |
| 2005/0181821 A1* | 8/2005 | Elomaa | 455/550.1 |
| 2006/0015819 A1 | 1/2006 | Hawkins et al. | |
| 2006/0117197 A1* | 6/2006 | Nurmi | 713/323 |
| 2007/0046561 A1* | 3/2007 | Cheon et al. | 345/1.1 |
| 2007/0182595 A1* | 8/2007 | Ghasabian | 341/22 |
| 2007/0257895 A1* | 11/2007 | Tolaio | 345/173 |
| 2008/0059880 A1* | 3/2008 | Cato et al. | 715/700 |
| 2008/0172611 A1* | 7/2008 | Karlberg et al. | 715/702 |
| 2008/0242371 A1* | 10/2008 | Chiba et al. | 455/574 |
| 2008/0268901 A1* | 10/2008 | Miramontes | 455/556.1 |
| 2009/0231275 A1* | 9/2009 | Odgers | 345/157 |
| 2010/0214250 A1* | 8/2010 | Gillespie et al. | 345/173 |
| 2010/0275033 A1* | 10/2010 | Gillespie et al. | 713/182 |
| 2010/0275163 A1* | 10/2010 | Gillespie et al. | 715/810 |

FOREIGN PATENT DOCUMENTS

| | | |
|---|---|---|
| EP | 1 076 442 A2 | 2/2001 |
| EP | 1 931 119 A1 | 6/2008 |
| KR | 1998-7101 | 3/1998 |
| KR | 2002-0056776 A | 7/2002 |
| KR | 2003-0022556 A | 3/2003 |
| RU | 2 170 496 C2 | 7/2001 |
| RU | 2 280 334 C2 | 7/2006 |
| RU | 2 285 949 C2 | 10/2006 |
| WO | WO 20060800858 A1 * | 8/2006 |

* cited by examiner

MOBILE COMMUNICATION TERMINAL WITH TOUCH SCREEN AND INFORMATION INPUTING METHOD USING THE SAME

The present invention claims priority to Korean Application No. 10-2007-D012637, filed in Korea on Feb. 7, 2007, the entire contents of which is hereby incorporated in its entirety.

BACKGROUND OF THE INVENTION

1. Field of the Invention

The present invention relates to a mobile communication terminal and corresponding method that first prevents information from being input on a touch screen of the terminal when a call is connected, and then allows information be input on the touch screen during the connected call after receiving a signal from a key button on the terminal.

2. Description of the Related Art

Mobile communication terminals now use a touch screen allowing a user to input information into the terminal via the touch screen. For example, the user can dial a phone number by touching numbers displayed on the touch screen. The user then touches a call button on the touch screen to call the input telephone number. The touch screen is then deactivated to prevent the user from inadvertently inputting information on the touch screen while the call is connected.

However, because the touch screen is deactivated, the user cannot perform other task such as writing a memo, etc. while the call is connected. Therefore, the user cannot perform other tasks while he or she is calling another person.

SUMMARY OF THE INVENTION

Accordingly, one object of the present invention is to address the above-noted and other objects.

Another object of the present invention is to allow the user to perform other functions or tasks on the touch screen in the middle of a call.

To achieve these and other advantages and in accordance with the purpose of the present invention, as embodied and broadly described herein, the present invention provides in one aspect a mobile terminal communication method, which includes activating a touch screen of the mobile terminal, entering into an inactive touch screen mode preventing information from being entered on the touch screen of the mobile terminal while a function is executed on the terminal, receiving an input signal through a specified key arranged on the terminal during a time when the inactive touch screen mode is entered, and entering into an active touch screen mode allowing information to be entered on the touch screen in accordance with the received input signal.

In another aspect, the present invention provides a mobile communication terminal, which includes a touch screen, a first key button, and a control unit configured to enter into an inactive touch screen mode preventing information from being entered on the touch screen of the mobile terminal while a function is executed on the terminal, to receive an input signal through the first key button during a time when the inactive touch screen mode is entered, and to enter into an active touch screen mode allowing information to be entered on the touch screen in accordance with the received input signal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
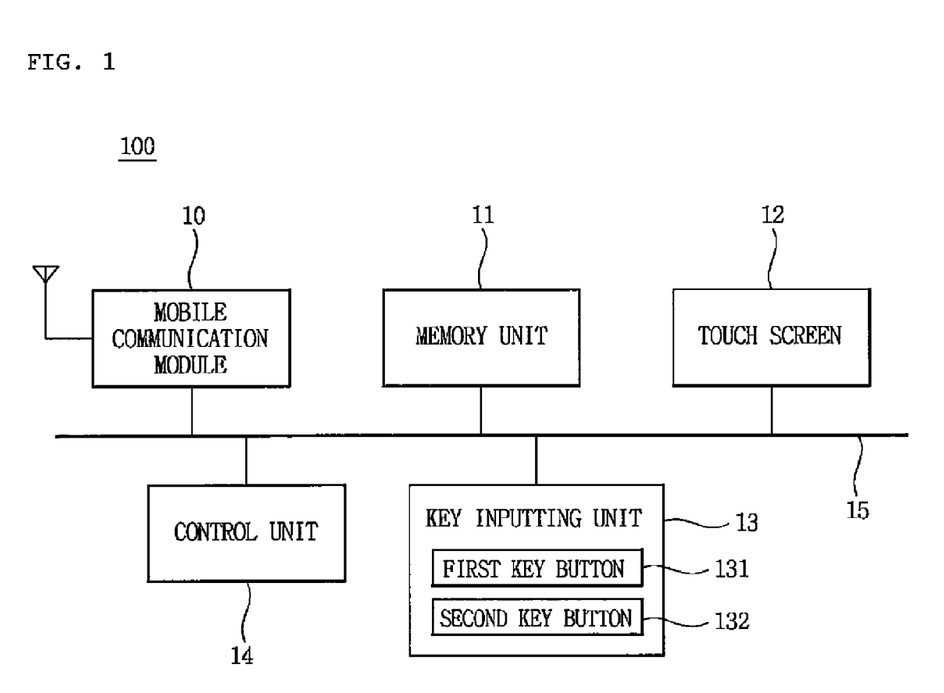
FIG. 1 is a block diagram illustrating a mobile communication terminal according to an embodiment of the present invention.

Turning first to FIG. 1, which is a block diagram illustrating a mobile communication terminal 100 according to an embodiment of the present invention. As shown, the mobile terminal 100 includes a mobile communication module 10, a memory unit 11, a touch screen 12, a key input unit 13 and a control unit 14. Further, a bus 15 connects each of the above-mentioned components, and the key input unit 13 includes a first key button 131 and a second key button 132.

Figure 2:
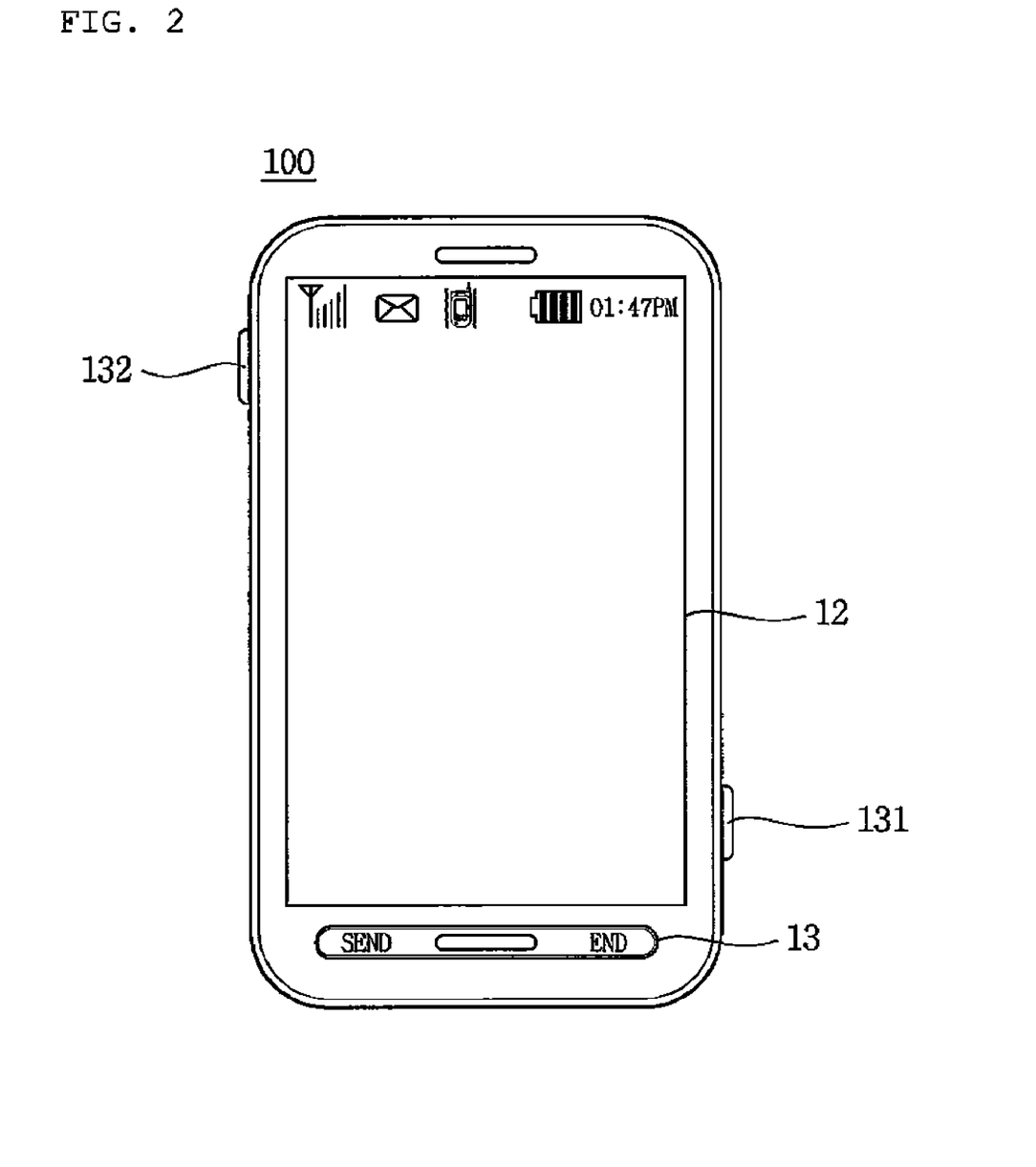
FIG. 2 is an exterior view illustrating a mobile communication terminal according to an embodiment of the present invention.

FIG. 2 is exterior view illustrating the mobile communication terminal shown in FIG. 1. As shown in FIG. 2, the mobile terminal includes the key input unit 13 and touch screen 12.

Further, the first and second key buttons 131 and 132 are provided on opposite sides of the terminal 100. Note that the key buttons 131 and 132 may be provided on any convenient location on the terminal 100 so that the user can easily find and select either key button 131 and 132.

In addition, the mobile communication module 10 is a wireless communication device used to send and receive data to and from a corresponding mobile communication network. For instance, calls and messages are sent and received using the mobile communication module 10. Further, the memory unit 11 stores software control programs for controlling the overall operations of the terminal 100, and also stores other types of data input, output and processed by the control unit 14.

In addition, the touch screen 12 functions as both a display to display information to the user and an inputting device allowing the user to enter information into the terminal 100. The key input unit 13 is also used to input information or to instruct the terminal 100 to perform a specific function. Note that the touch screen 12 can also be used to instruct the terminal 100 to perform a specific function.

The key input unit 13 includes key buttons for performing a predetermined function such as various number keys, direction keys, etc. For example, FIG. 2 illustrates the key input unit 13 including a send call and end call button in addition to the first and second key buttons 131 and 132.

Further, in one embodiment of the present invention, the first key button 131 is used by the user to enter into an information input mode while a call is connected, and the second key button 132 is used to activate or deactivate the touch screen 12. Also, in another embodiment, it is possible to use either the first key button 131 or the second key button 132 to both enter into the information input mode and to activate and deactivate the touch screen 12.

In addition, the control unit 14 controls the overall operations of the mobile terminal 100 and controls each of the modules/units described in FIG. 1. Further, although not shown in FIG. 1, the mobile terminal 100 with the touch screen 12 may also include a broadcast receiving module capable of receiving broadcasts signals from a broadcasting network, a communication module capable of communicating with the wireless Internet, a camera module, a vibration module to generate vibration, and various types of sensors (e.g., GPS sensors, etc).

Figure 3:
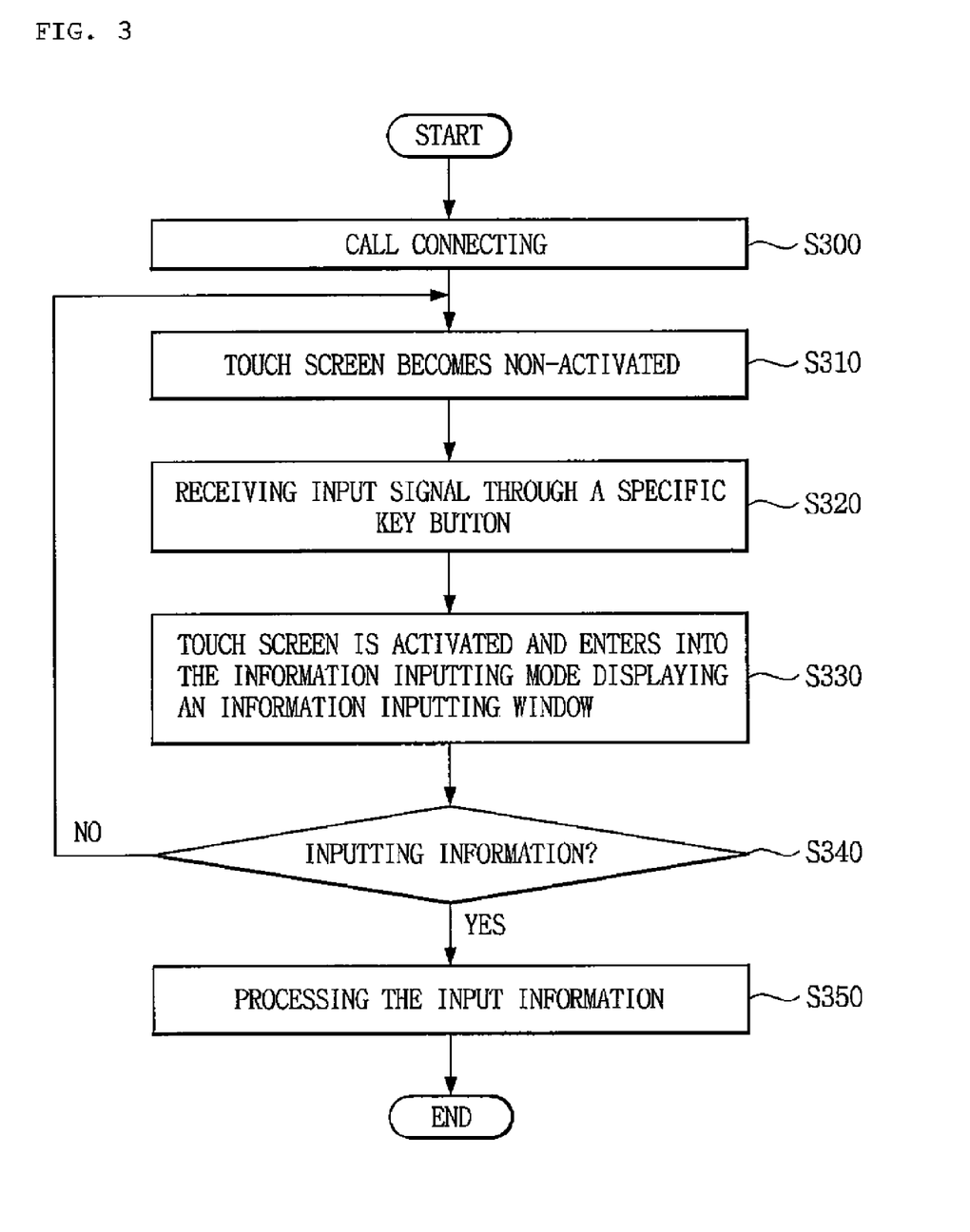
FIG. 3 is a flowchart illustrating a mobile communication method according to an embodiment of the present invention.

Turning now to FIG. 3, which is a flowchart illustrating a mobile communication method according to an embodiment of the present invention. FIG. 1 will also be referred to in this description. As shown, a call is first connected through the mobile communication module 10 (S300), and the touch screen 12 is automatically entered into a non-activation mode (S310). That is, when the call is connected, the control unit 14 places the touch screen 12 in a non-activated state which prevents the user from accidentally entering information on the touch screen 12 during the phone call. That is, even if the user touches the screen 12 during the non-activated state, no information is input into the mobile terminal 100.

Figure 4:
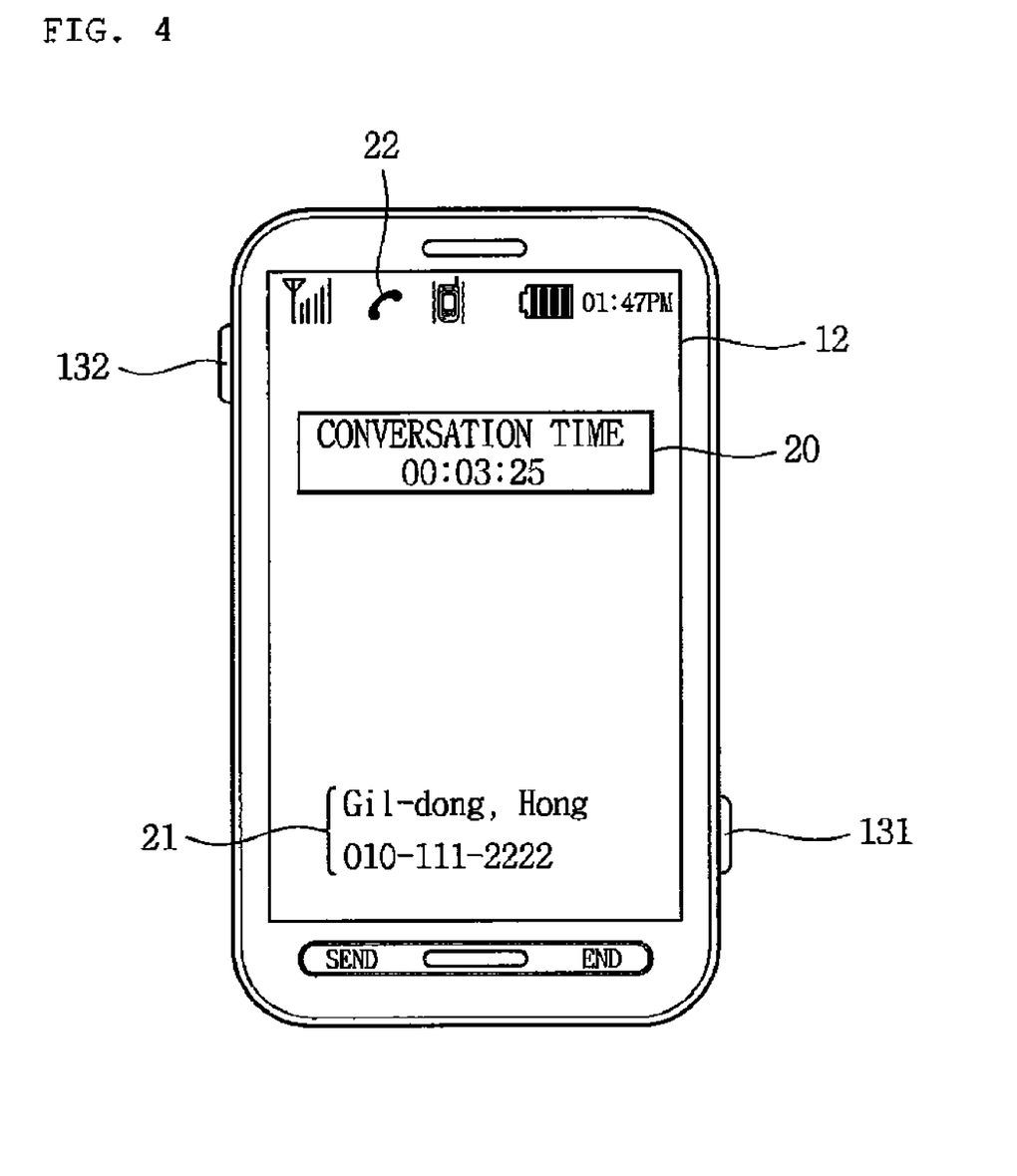
FIG. 4 is an overview illustrating information displayed on a touch screen of the terminal when a call is connected according to an embodiment of the present invention.

In more detail, FIG. 4 is an overview illustrating information displayed on the touch screen of the terminal when a call is connected according to an embodiment of the present invention. As shown, when the call is connected, the touch screen 12 displays an amount of time the user has been talking for that particular call in a display window 20, and the name and the phone number of the person calling in another display window 21. Further, on an upper portion of the touch screen 12, symbols indicating a reception signal value, battery level, time of day, a phone symbol 22 indicating the call is connected, etc. are displayed.

Returning to FIG. 3, the user then presses or selects the first key button 131 while the call is connected (S320). That is, the user presses the first key button 131 to place the touch screen 12 in an activated state, even though the call is currently connected. Thus, when the user manipulates (presses, touches, selects, etc.) the first key button 131, the control unit 14 receives an input signal indicating the touch screen 12 is to be placed in an activated state.

Then, the control unit 14 places the touch screen 12 into an activated state, which includes an information inputting mode (S330). FIGS. 5-8 illustrate different examples of the information inputting mode and will be described later. Further, in the information inputting mode, the user can input a variety of different types of information on the touch screen 12.

Next, in step S340, the control unit 14 determines if the user has input any information via the touch screen 12 within a predetermined amount of time (e.g., 10 seconds, 30 seconds, 1 minute, etc.) (S340). If the user does not enter any information on the touch screen 12 during the predetermined amount of time (no in S340), the process returns to step S310 and the control unit 14 places the touch screen 12 back into the non-activation state.

On the contrary, if the user has inputted information onto the touch screen 12 (yes in S340), the control unit 14 processes, executes, etc. the corresponding function (S350). For example, the control unit 14 stores the input information in the memory unit 11, and/or performs a specified function with the input information.

Turning next to FIGS. 5 to 8, which are overviews illustrating different inputting mode examples when the user selects the first key button 131 when a call is connected. FIG. 1 will also be referred to in this description.

Figure 5:
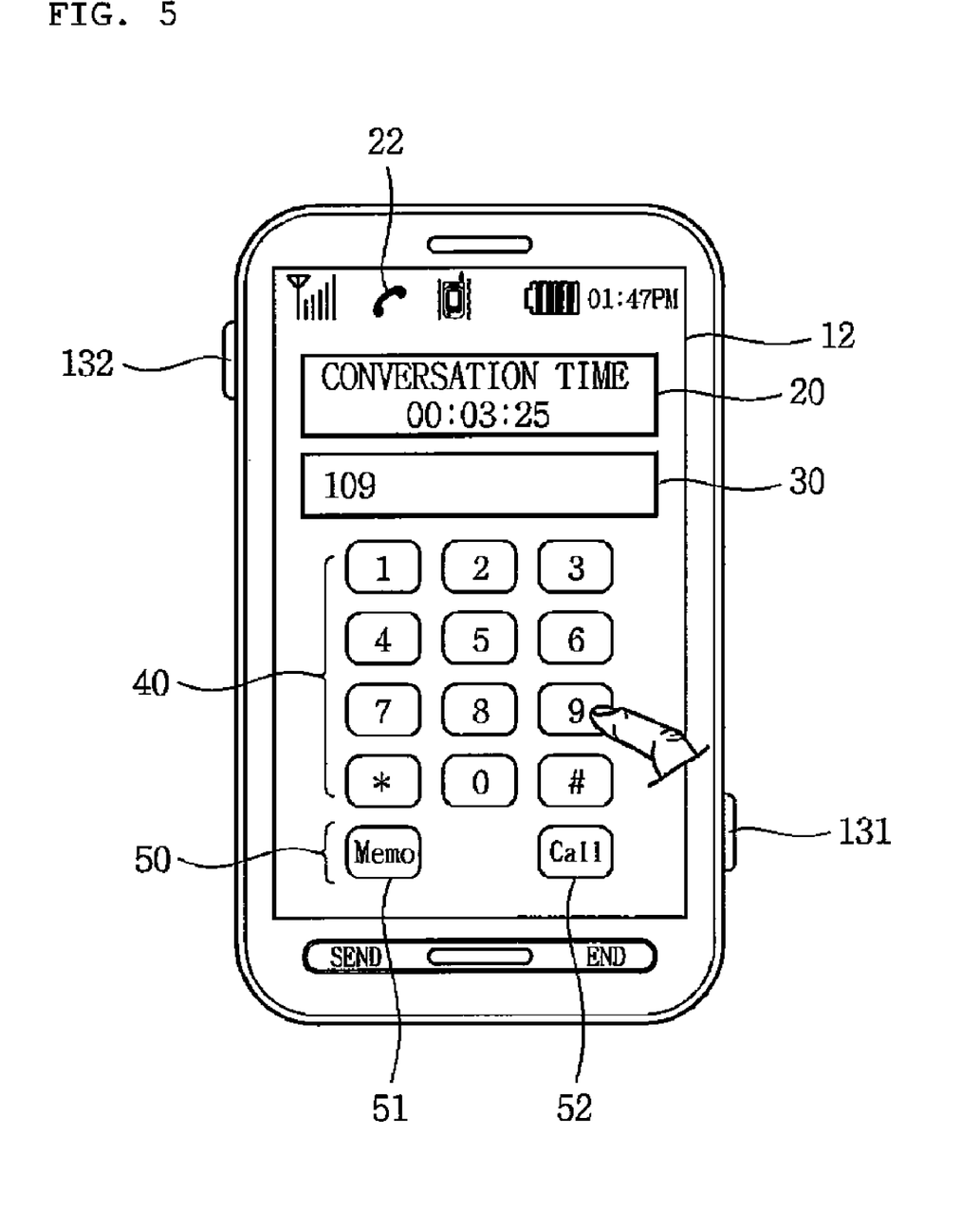
FIG. 5 is an overview illustrating a keypad displayed on a touch screen of the terminal when a call is connected according to an embodiment of the present invention.

In more detail, FIG. 5 is an overview illustrating a keypad displayed on the touch screen of the terminal when a call is connected according to an embodiment of the present invention. That is, as shown, the control unit 14 displays a number keypad 40, a display window 30 displaying the numbers input through the number keypad 40, and a function button 50 for performing a specified function on the touch screen 12.

As shown in the example in FIG. 5, the user selected the first key button 131 to enter into an input mode from the deactivated mode shown in FIG. 4. The user has also entered the number "109" using the number keypad 40 while talking to the person called "Gil-dong, Hong" (see FIG. 4). Further, as shown in FIG. 5, the function button 50 includes a memo button 51 and a call button 52.

Thus, in the example shown in FIG. 5, the user is entering a telephone number of a third party so as to enter the third party into a conference call with the first party (i.e., Mr. Gil-dong Hong). Therefore, when the user has entered all required numbers for calling the third party, the user can select the call button 52 to initiate the conference call. The memo button 51 will be described in detail with respect to FIGS. 7 and 8.

Figure 6:
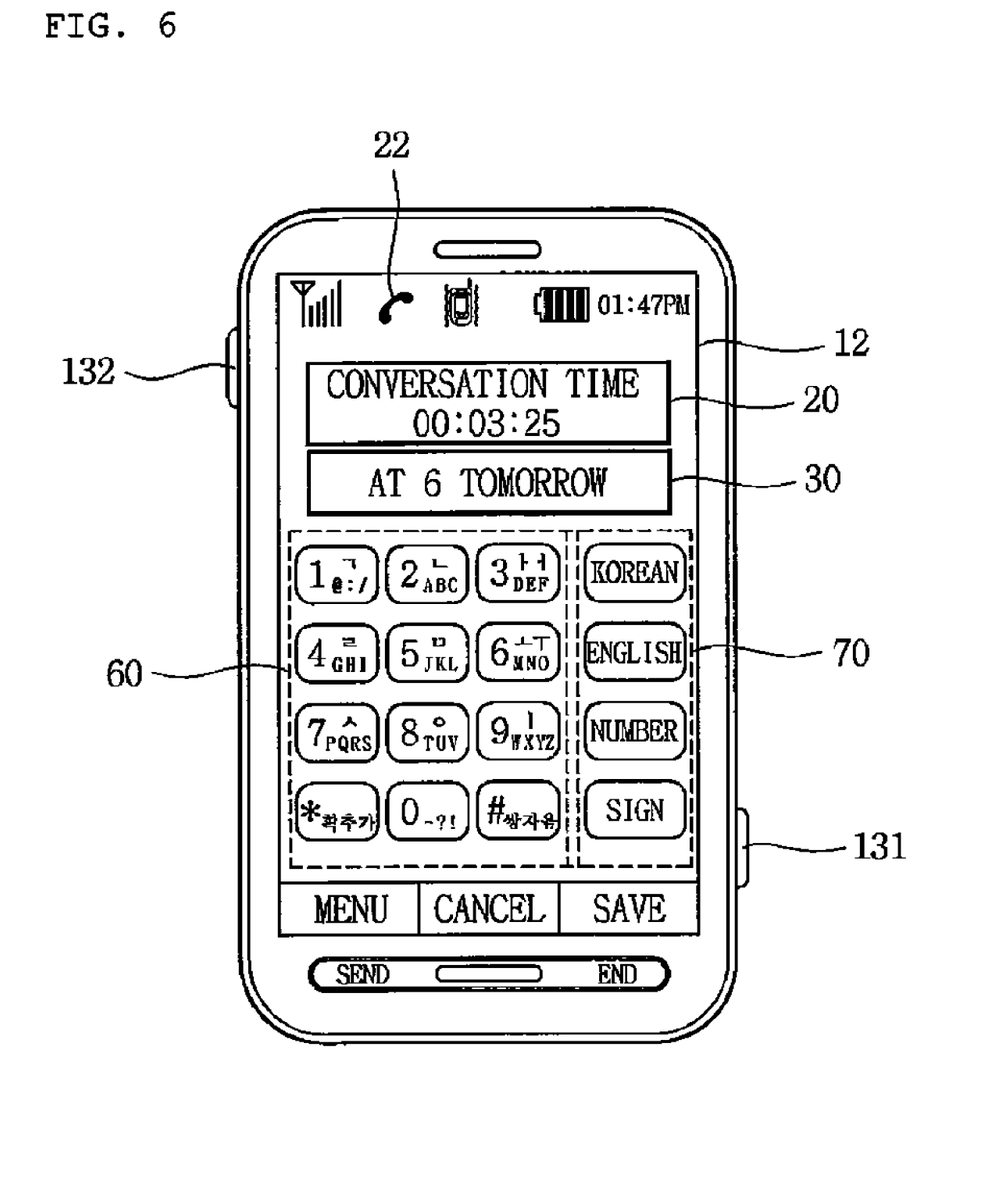
FIG. 6 is an overview illustrating a keypad and input mode selection buttons displayed on a touch screen of the terminal when a call is connected according to an embodiment of the present invention.

Turning next to FIG. 6, which is an overview illustrating a keypad and input mode selection buttons displayed on the touch screen of the terminal when a call is connected according to an embodiment of the present invention. In more detail, FIG. 6 is similar to FIG. 5, except the control unit 14 displays a keypad 60 that includes displaying letters/numbers/signs, the display window 30 displaying information input through the keypad 60, and an input mode selection window 70 to select the type of input mode (e.g., character mode such as Korean or English, a number mode or a sign mode).

In addition, FIG. 6 illustrates four touch buttons including Korean, English, number and sign for the input selection window 70. However, the input mode selection window 70 can include only one of the touch buttons, in which the input mode is toggled in the order of Korean, English, number and sign each time the user touches the touch button.

In addition, as shown in the example of FIG. 6, the user has entered the phrase "at 6 tomorrow" by touching the appropriate letters and number on the keypad 60 and using the input mode selection window 70 (i.e., the phrase "at 6 tomorrow" is shown as having been input via the display window 30). Note that the user has performed this entry while he or she is still connected to the other party Mr. Gil-dong Hong (i.e., the phone indicator 22 and the conversation time in the display window 20 indicates the call is currently connected). That is, the user is able to activate this input mode by manipulating the first key button 131.

Further, the user can save the information input using the keypad 60 and appropriate buttons in the input mode selection window 70 by selecting the save button displayed on the lower portion of the touch screen 12. The user can also cancel this operation by selecting the cancel button or change to a different menu input operation by selecting the menu button.

Figure 7:
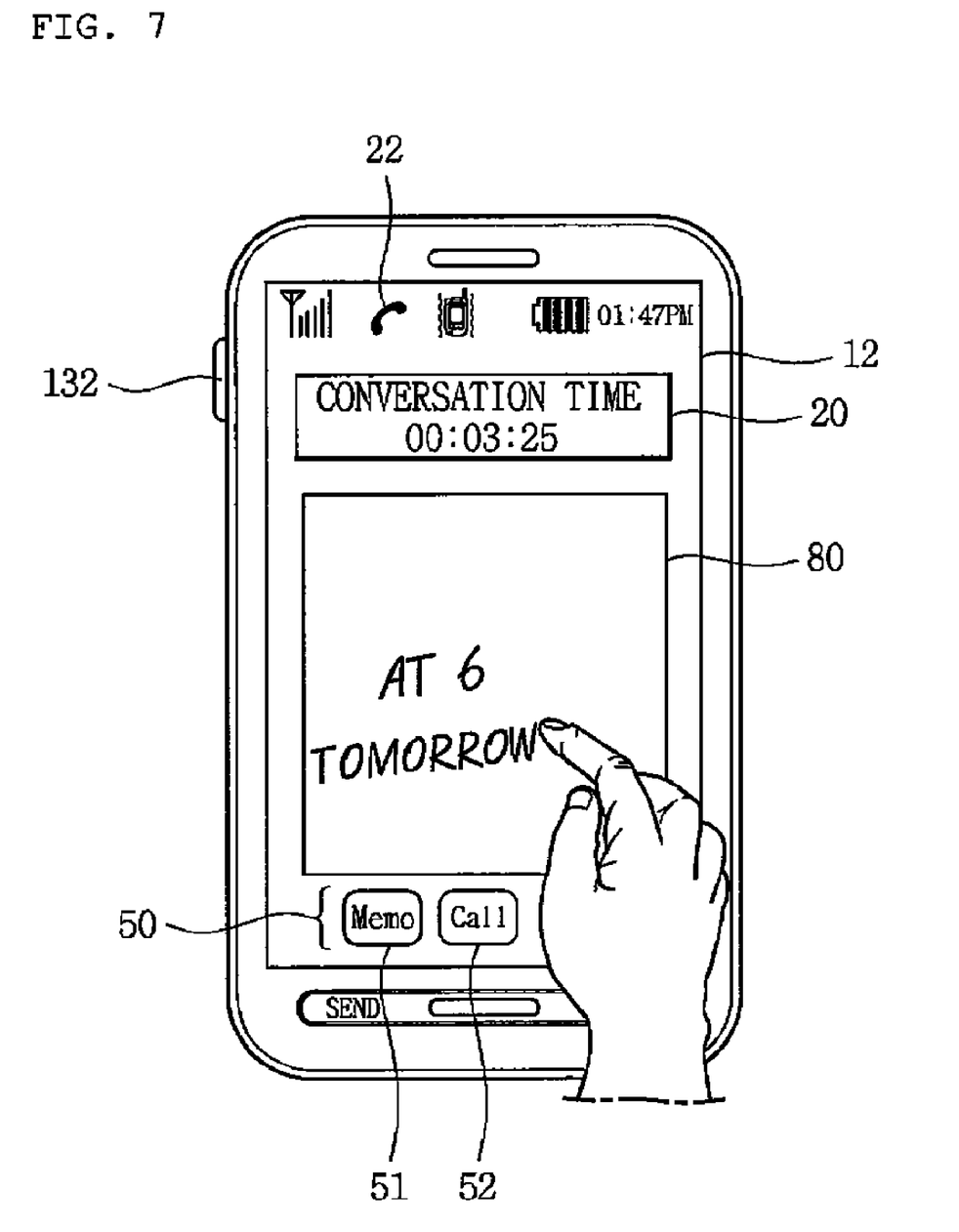
FIG. 7 is an overview illustrating a writing tablet displayed on a touch screen of the terminal when a call is connected according to an embodiment of the present invention.

Turning next to FIG. 7, which is an overview illustrating a writing tablet displayed on the touch screen 12 of the terminal when a call is connected according to an embodiment of the present invention. Note this embodiment is similar to the embodiments shown in FIGS. 5 and 6 in that the user can enter this input mode by initially selecting the first key button 131.

In more detail, after the user selects the first key button 131, the control unit 14 displays a writing tablet window 80 allowing the user to write information in real-time while still being connected with the original caller. For instance, in the example of FIG. 7, the user has input the memo "at 6 tomorrow" into the writing input window 80 using his finger (or a stylus pen) while still being connected to Mr. Gil-dong, Hong.

Figure 8:
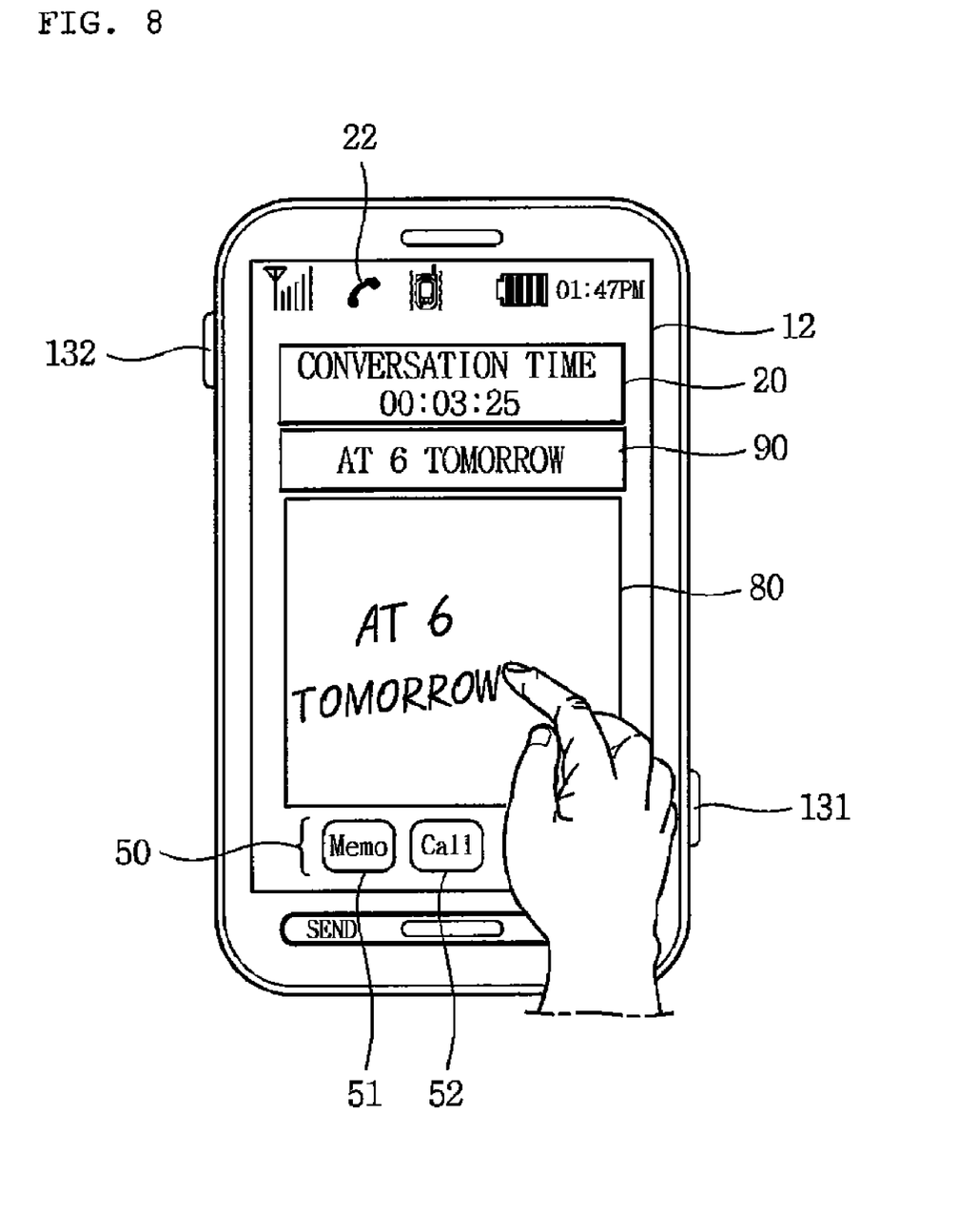
FIG. 8 is an overview illustrating a writing tablet and display window including contents written on the writing table displayed on a touch screen of the terminal when a call is connected according to an embodiment of the present invention.

FIG. 8 is similar to FIG. 7, except that the control unit 14 additionally displays an information inputting window 90, which displays the information input by the user using the writing tablet 80. In more detail, the mobile terminal according to this embodiment includes a character recognition or sign recognition algorithm that recognizes the information written onto the writing tablet 80 and displays this information in the inputting window 90.

In addition, the user can use the function button 50 illustrated in FIGS. 5, 7 and 8 to perform a predetermined function. For example, the user can use the memo button 51 to save any input information (e.g., in the display window 30 in FIG. 5, or the information input onto the writing tablet 80 in FIGS. 7 and 8). Thus, the user can save a simple memo into the memory unit 11 while talking to a person over the phone.

Further, the user can use the call button 52 to set up a conference call with a third party (as discussed above). For example, if the user A is talking with a friend B and wants to add a friend C to the call with the friend B, the user A can use the call button 52 to initiate the third party call with the friend C. Further, because of the advantageous memo features of the present invention, the user A can first ask the friend B for the phone number of the friend C (assuming the user A did not know the number) and write the number of the friend C using the above-described memo features. Then, the user A can select the call button 51 to make the call to the friend C to establish a three party conference call with the user A and friends B and C. A fourth party, etc. may also be added in a similar manner.

Figure 9:
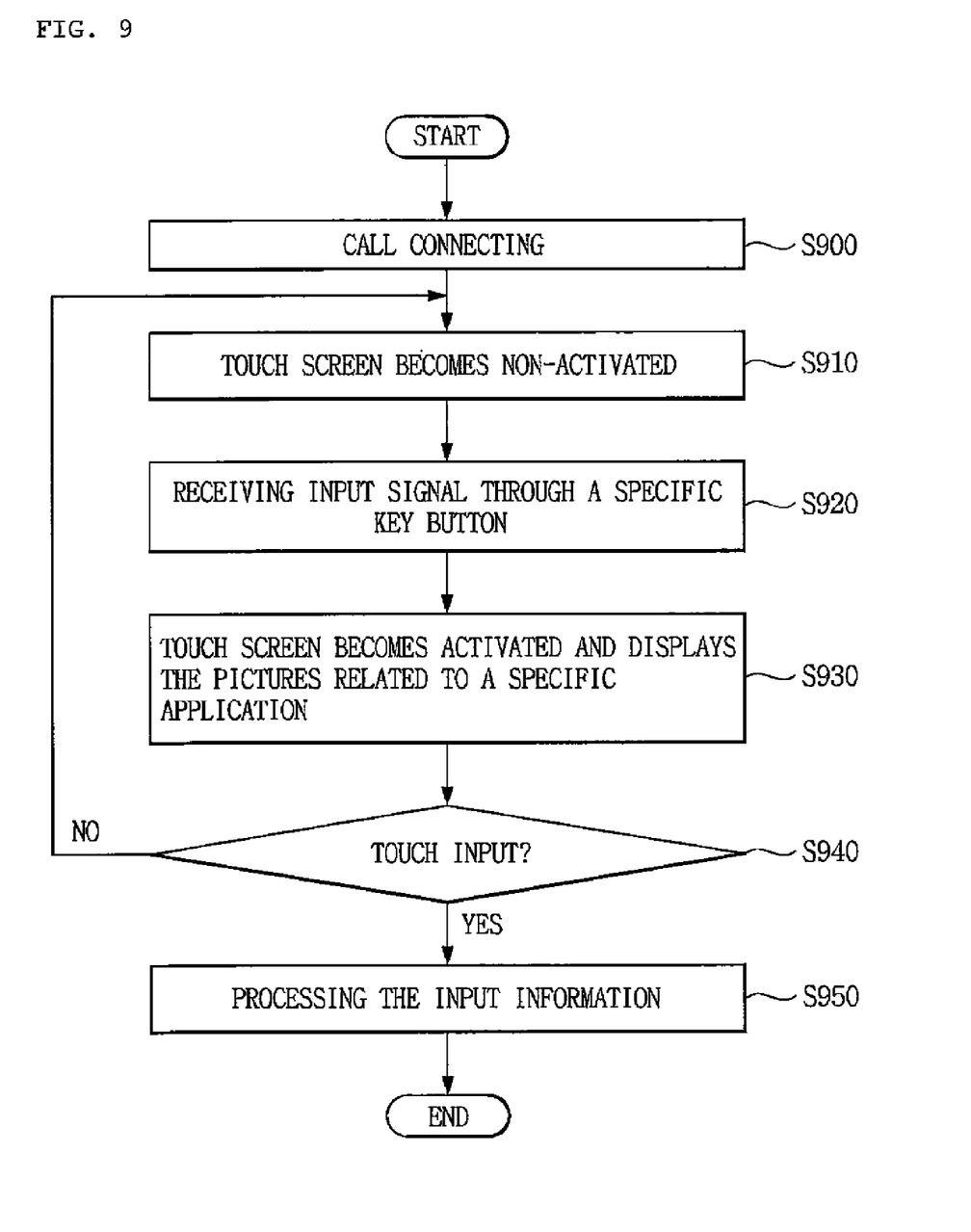
FIG. 9 is a flowchart illustrating a mobile communication method according to another embodiment of the present invention.

Turning now to FIG. 9, which is a flowchart illustrating a mobile communication method according to another embodiment of the present invention. FIGS. 1 and 2 will also be referred to in this description.

As shown in FIG. 9, when the call is first connected (S900), the control unit 14 first places the touch screen 12 into the non-activation mode (S910). Then, in step S920, the control unit 14 receives the input signal through the first key button 131 in the state that a call is connected (S920). This is similar to the embodiment in FIG. 3.

This embodiment differs from the embodiment shown in FIG. 3, because when the user selects the first key button 131 to re-activate the touch screen 12, the embodiment in FIG. 9 re-activates the touch screen 12 and displays a picture related to a predetermined application on the touch screen 12.

Figure 10:
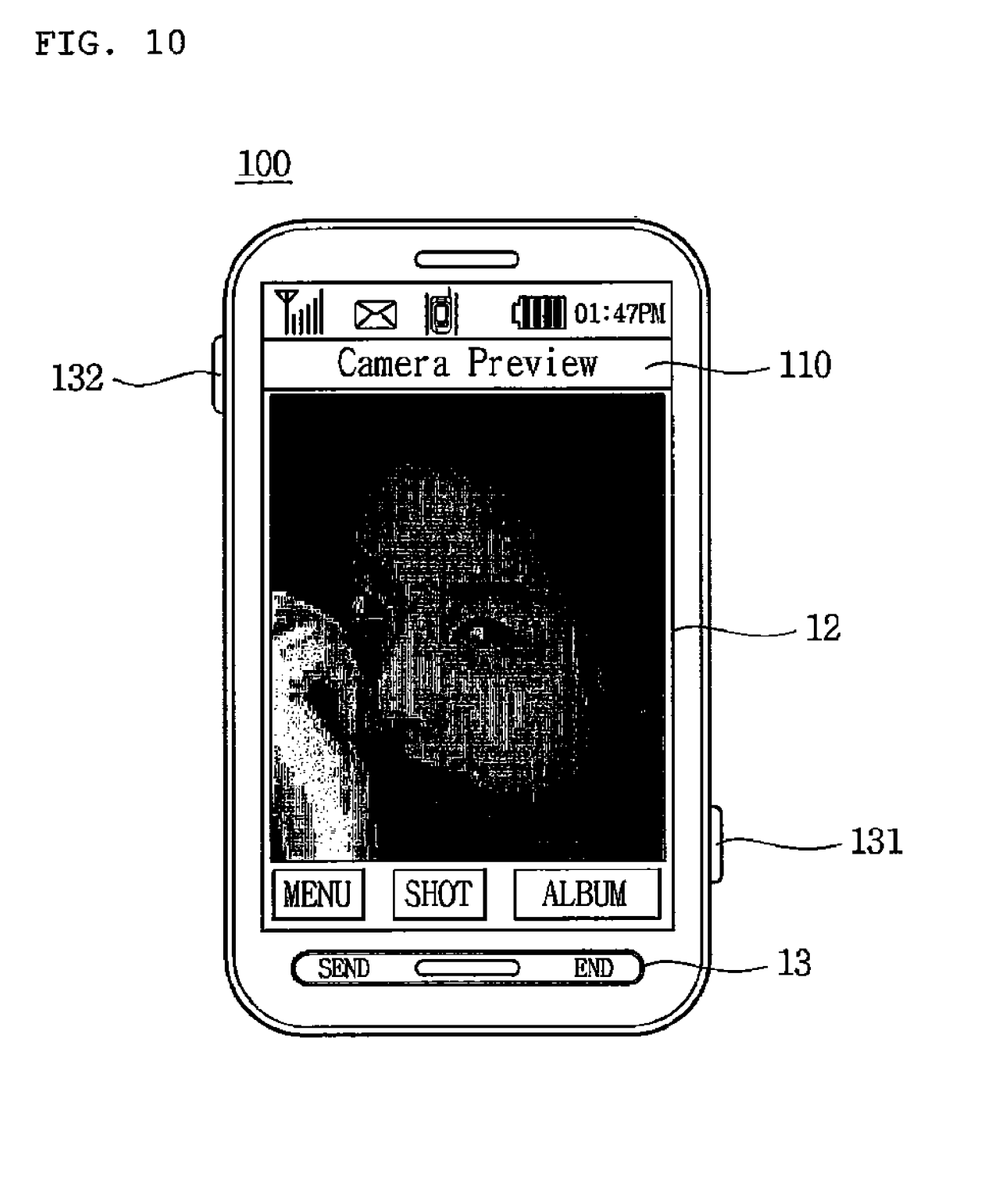
FIG. 10 is an overview illustrating a picture being displayed on a touch screen of the terminal when a call is connected according to an embodiment of the present invention.

For example, FIG. 10 illustrates an example of a predetermined picture being displayed on the touch screen 12 when the user selects the first button key 131. That is, as shown in FIG. 10, a predetermined picture 110 is displayed indicating to the user that the camera mode is now activated. Thus, the user can take a picture and perform other camera functions (save pictures, create photo albums, etc.) using the different function buttons.

In addition, similar to the embodiment in FIG. 3, and as shown in FIG. 9, the control unit 14 determines if the user has input any commands or information on the touch screen 12 within a predetermined amount of time (S940). If the user has not input any commands or information within the predetermined time period (no in S940), the process returns to the step 910 and the touch screen 12 is deactivated, Alternatively, if the user has input a command or other information related to the displayed function (e.g., camera function in this example), the control unit 14 executes the corresponding function (S950).

Figure 11:
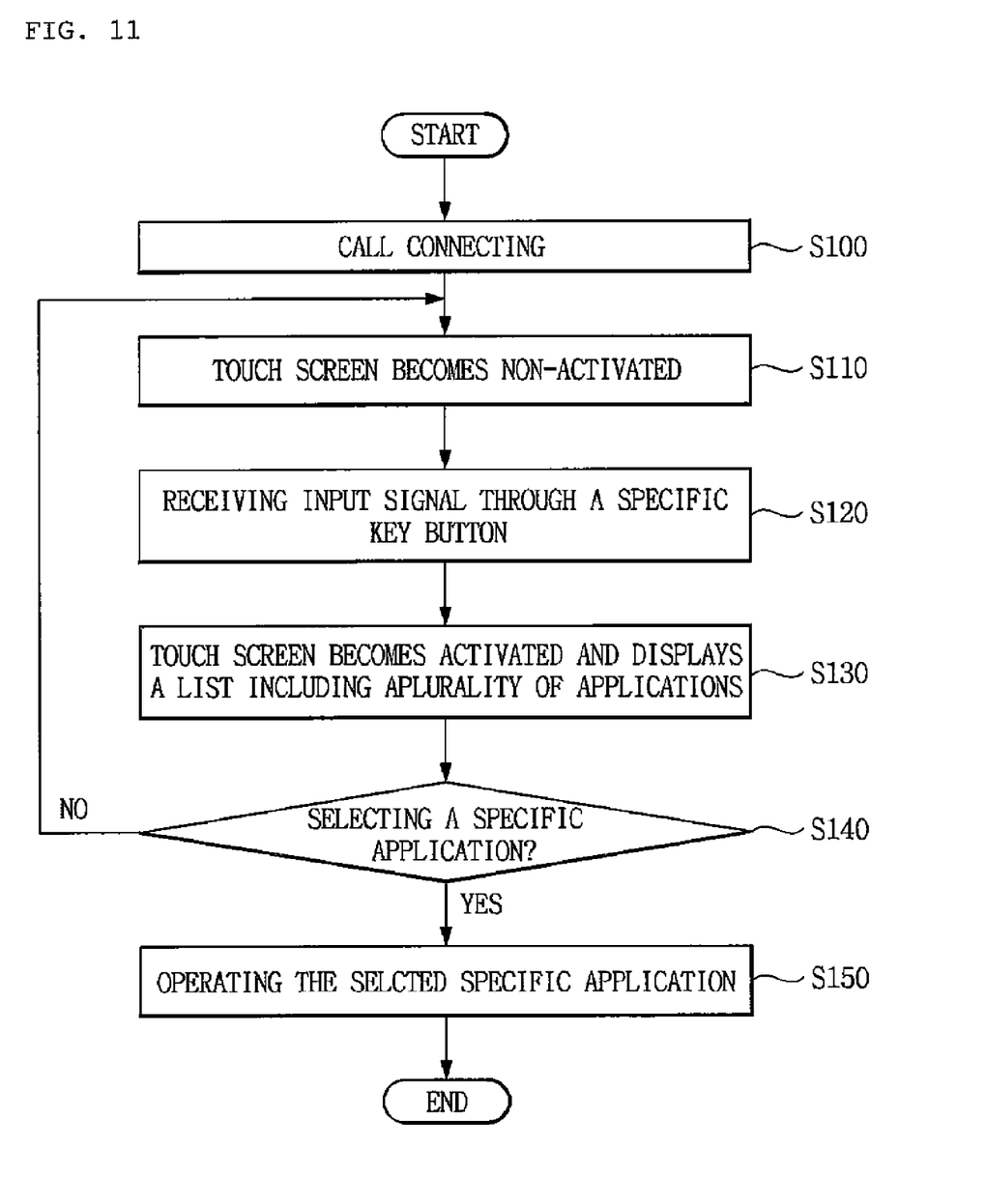
FIG. 11 is a flowchart illustrating yet another mobile communication method according to an embodiment of the present invention.

Next, FIG. 11 is a flowchart illustrating yet another mobile communication method according to an embodiment of the present invention. Steps S100, S110 and S120 are the same as the steps S300, S310 and S320 in FIG. 3 and steps S900, S910 and S920 in FIG. 9, and therefore a detailed description will not be repeated.

In FIG. 11, however, when the user selects the first button key 131, the control unit 14 re-activates the touch screen 12 and presents a list of applications or functions that the user can select from while still being connected with an original call (S130). Then, the control unit 14 determines if the user selects one of the applications or functions (S140) and executes any selected application or function (S150). If the user does not select a function within a predetermined amount of time (no in S140), the process returns to step S110 and the touch screen 12 is again de-activated.

Figure 12:
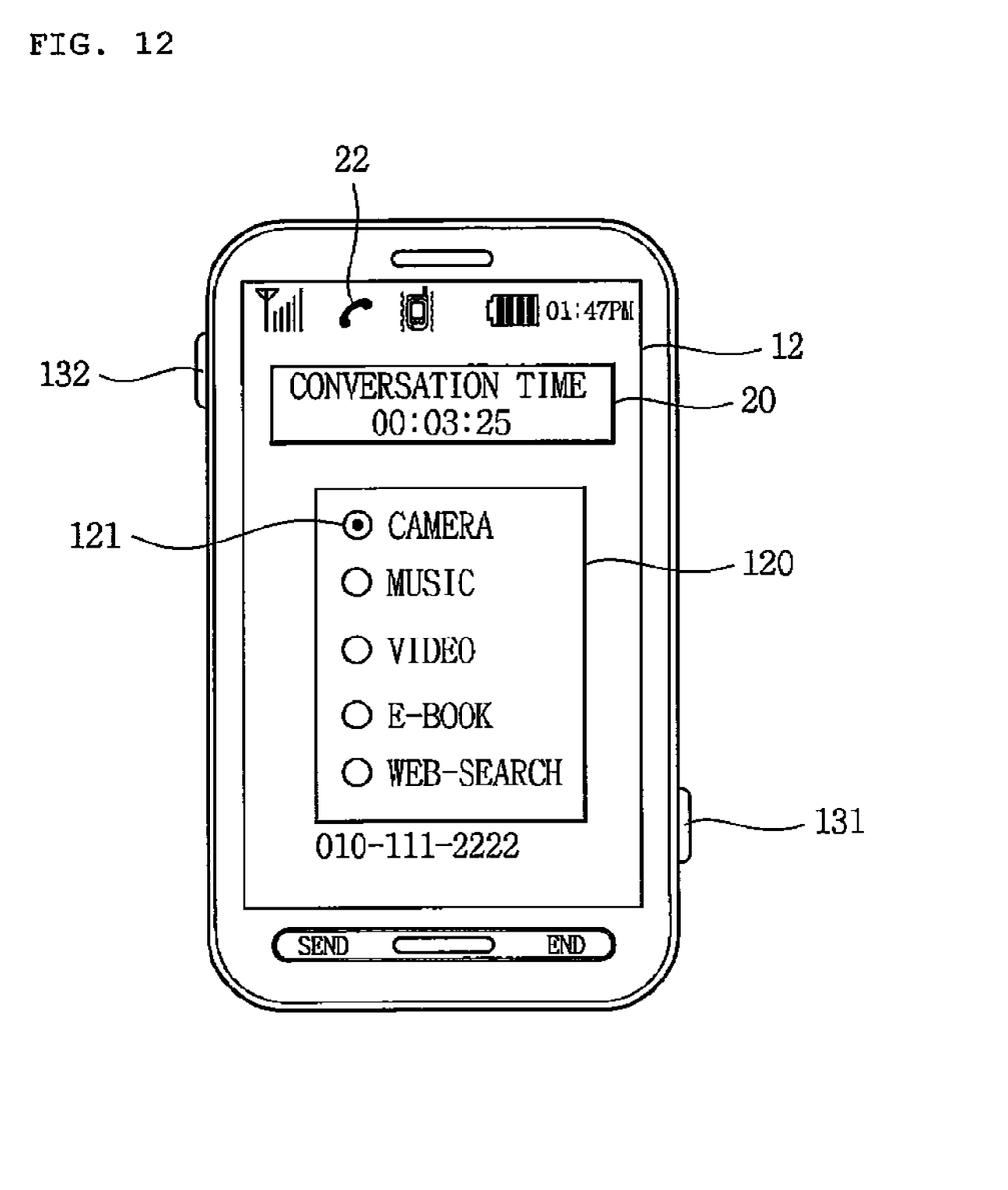
FIG. 12 is an overview illustrating a list of applications that may be performed when the call is connected.

For example, FIG. 12 is an overview illustrating a list of five applications being displayed by the control unit 14 when the user selects the first key button 131 (again, note that the call is still connected as indicated by the identifier 22). In this example, the control unit 14 displays a list including a camera function, music playing function, a video playing function, an E-book function and a Web-searching function in a pop-up window 120 on the touch screen 12. The user can then select one the functions/applications by touching the corresponding function/application. For example, FIG. 12 illustrates the camera function being selected as identified by the selection identifier 121. Thus, in this example, the control unit 14 would then execute the camera function.

Further, the list of applications or functions displayed may be preset by a manufacture of the terminal and may also be set by a user using the appropriate menu functions on the terminal. Thus, the list of displayed functions can be changed by the user as needed.

In addition, the above-described embodiments illustrate certain applications or functions (e.g., keypad, writing tablet, etc.) being displayed on the touch screen when the user selects the first key button 131. Note that the user can enter the specific program or function that they want to have appear when selecting the first key button 131 using the appropriate menu options on the terminal.

For instance, the user can previously establish the various specified applications such as a music playing function, a video playing function, etc. to be displayed, rather than the camera application illustrated in FIG. 10.

As described above, the mobile communication terminal 100 has a separate first key button 131 for entering into the information inputting mode and a separate second key button 132 for establishing the activation and the non-activation of the touch screen 12. However, it is possible to use only one key button to perform both functions. In this instance, the control unit 14 decides which function to perform based on the operation of the single key button (e.g., the single key may be pressed once to perform the activate/deactivate function, and be pressed twice to perform the input information mode function, etc.) The single key button may also be pressed a short amount of time to indicate a first function and pressed a long amount of time to indicate a second function.

For instance, assume both of the functions are assigned to the first key button 131. In this instance, the control unit 14 controls the activation and the non-activation establishing function of the touch screen 12 to be performed when a long key signal is received from the first key button 131. Further, the control unit 14 controls the touch screen 12 to be entered into the information inputting mode when a short key signal is received from the first key button 131.

The above-described mobile communication terminal and corresponding method has several advantages. For example, the user can conveniently input predetermined information in an activated touch screen while talking over the phone. In addition, the user can conveniently process information input through the activated touch screen while the user talks over the phone. In addition, the user can easily enter into a specific application while talking over the phone.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal communication method, comprising:
    activating a touch screen of the mobile terminal;
    activating a key to generate a signal;
    entering into an inactive touch screen mode preventing information from being entered on the touch screen of the mobile terminal while a function is executed on the terminal based on the generated signal;
    receiving an input signal through a specified key arranged on the terminal during a time when the inactive touch screen mode is entered and the function is executed on the terminal; and
    entering into an active touch screen mode allowing information to be entered on the touch screen and displaying an information input region on the touch screen in accordance with the received input signal.

2. The method of claim 1, wherein the function corresponds to a phone call being connected.

3. The method of claim 1, further comprising:
    re-entering the inactivation touch screen mode when information is not input onto the touch screen for a predetermined amount of time after the active touch screen mode has been entered.

4. The method of claim 1, wherein the information input region includes a keypad including touch buttons that may be touched to input information.

5. The method of claim 4, further comprising:
    displaying a display window for displaying information input using the keypad.

6. The method of claim 4, further comprising:
    displaying a function button that may be touched to perform a specified function and a call button that may be touched to connect another party to the phone call that is connected.

7. The method of claim 4, further comprising:
    displaying an input mode selection window including at least one input mode touch button that may be touched to designate an input characteristic of the touch buttons included in the keypad.

8. The method of claim 7, wherein the input characteristics of the touch buttons included in the keypad include at least one of a language input, a character input, a numeral input, and a sign input.

9. The method of claim 7, wherein the at least one touch button in the input mode selection window includes a single button that changes the input characteristics of the touch buttons included in the keypad, said single button changing the input characteristics based on a length of time the single button is touched or a number of times the single button is successively touched.

10. The method of claim 7, wherein the at least one touch button in the input mode selection window includes a plurality of touch mode buttons, each touch mode button corresponding to a different input mode characteristic.

11. The method of claim 1, wherein the information input region includes a writing input window allowing information to be written on the writing input window.

12. The method of claim 11, further comprising:
    displaying a display window on the touch screen for displaying the information written on the writing input window.

13. The method of claim 11, further comprising:
    displaying a memo function button that may be touched to save the information writing on the writing input window as a memo, and a call button that may be touched to connect another party to a call that is connected.

14. The method of claim 1, wherein information related to the executing function is displayed on the touch screen while the function is executed on the terminal.

15. A mobile terminal communication method, comprising:
    activating a touch screen of the mobile terminal;
    activating a key to generate a signal;
    entering into an inactive touch screen mode preventing information from being entered on the touch screen of the mobile terminal while a function is executed on the terminal based on the generated signal;

receiving an input signal through a specified key arranged on the terminal during a time when the inactive touch screen mode is entered and the function is executed on the terminal;

entering into an active touch screen mode allowing information to be entered on the touch screen in accordance with the received input signal; and displaying a list of functions that may be touched and executed on the touch screen in accordance with the received input signal.

16. The method of claim 15, wherein information related to the executing function is displayed on the touch screen while the function is executed on the terminal.

17. The method of claim 15, wherein the list of functions that may be touched and executed include at least one of a camera function, a music function, a video function, an electronic-book function and a web-search function.

18. A mobile communication terminal, comprising:
a touch screen;
a first key button and a second key button; and
a control unit configured to enter into an inactive touch screen mode preventing information from being entered on the touch screen of the mobile terminal while a function is executed on the terminal based on a signal generated by the second key button, to receive an input signal through the first key button during a time when the inactive touch screen mode is entered and the function is executed on the mobile terminal, and to enter into an active touch screen mode allowing information to be entered on the touch screen and display an information input region on the touch screen in accordance with the received input signal.

19. The mobile communication terminal of claim 18, wherein the function corresponds to a phone call being connected.

20. The mobile communication terminal of claim 18, wherein the control unit re-enters the inactivation touch screen mode when information is not input onto the touch screen for a predetermined amount of time after the active touch screen mode has been entered.

21. The mobile communication terminal of claim 18, wherein the information input region includes a keypad including touch buttons that may be touched to input information.

22. The mobile communication terminal of claim 21, wherein the control unit further displays a display window for displaying information input using the keypad.

23. The mobile communication terminal of claim 21, wherein the control unit further displays a function button that may be touched to perform a specified function and a call button that may be touched to connect another party to the phone call that is connected.

24. The mobile communication terminal of claim 18, wherein information related to the executing function is displayed on the touch screen while the function is executed on the mobile terminal.

25. A mobile communication terminal, comprising:
a touch screen;
a first key button and a second key button; and
a control unit configured to enter into an inactive touch screen mode preventing information from being entered on the touch screen of the mobile terminal while a function is executed on the terminal based on a signal generated by the second key button, to receive an input signal through the first key button during a time when the inactive touch screen mode is entered and the function is executed on the mobile terminal, to enter into an active touch screen mode allowing information to be entered on the touch screen in accordance with the received input signal, and to display a list of functions that may be touched and executed on the touch screen in accordance with the received input signal.

26. The mobile communication terminal of claim 21, wherein the control unit further displays an input mode selection window including at least one input mode touch button that may be touched to designate an input characteristic of the touch buttons included in the keypad.

27. The mobile communication terminal of claim 26, wherein the input characteristics of the touch buttons included in the keypad include at least one of a language input, a character input, a numeral input, and a sign input.

28. The mobile communication terminal of claim 26, wherein the at least one touch button in the input mode selection window includes a single button that changes the input characteristics of the touch buttons included in the keypad, said single button changing the input characteristics based on a length of time the single button is touched or a number of times the single button is successively touched.

29. The mobile communication terminal of claim 26, wherein the at least one touch button in the input mode selection window includes a plurality of touch mode buttons, each touch mode button corresponding to a different input mode characteristic.

30. The mobile communication terminal of claim 18, wherein the information input region includes a writing input window allowing information to be written on the writing input window.

31. The mobile communication terminal of claim 30, wherein the control unit further displays a display window on the touch screen for displaying the information written on the writing input window.

32. The mobile communication terminal of claim 30, wherein the control unit further displays a memo function button that may be touched to save the information writing on the writing input window as a memo, and a call button that may be touched to connect another party to a call that is connected.

33. The mobile communication terminal of claim 25, wherein information related to the executing function is displayed on the touch screen while the function is executed on the mobile terminal.

34. The mobile communication terminal of claim 25, wherein the list of functions that may be touched and executed include at least one of a camera function, a music function, a video function, an electronic-book function and a web-search function.

* * * * *